United States Patent [19]
Arima et al.

[11] 3,801,457
[45] Apr. 2, 1974

[54] METHOD FOR PRODUCING L-TRYPTOPHAN

[75] Inventors: Kei Arima, Tokyo; Ikuo Nugami, Kyoto; Masahiko Yoneda, Kobe, all of Japan

[73] Assignee: Takedo Chemical Industries Ltd., Osaka, Japan

[22] Filed: Mar. 7, 1972

[21] Appl. No.: 232,617

[30] Foreign Application Priority Data
Mar. 9, 1971  Japan.............................. 46-12970

[52] U.S. Cl.................. 195/29, 195/28 R, 195/30, 195/47
[51] Int. Cl............................................ C12d 1/00
[58] Field of Search................ 195/28 R, 29, 30, 47

[56] References Cited
UNITED STATES PATENTS
3,700,558  10/1972  Thiemann et al..................... 195/29
2,999,051  9/1961  Malin.................................. 195/29

Primary Examiner—A. Louis Monacell
Assistant Examiner—Robert J. Warden

[57] ABSTRACT

An improved method is provided for producing L-tryptophan by cultivating a microorganism of the genus Bacillus which requires anthranilic acid for its growth and is also resistant to the inhibiting action of anthranilic acid. The microorganism is cultivated in a medium containing a growth-limiting amount of anthranilic acid, indole and/or tryptophan followed by the addition to the culture broth of anthranilic acid so as to cause the microorganism to elaborate L-tryptophan and then recovering the desired product.

11 Claims, No Drawings

3,801,457

METHOD FOR PRODUCING L-TRYPTOPHAN

This invention relates to an improved method for the production of L-tryptophan from anthranilic acid advantageously, with the aid of a microorganism of the genus Bacillus.

L-Tryptophan is an important compound which is useful not only as a chemical reagent but also as an essential amino acid which is often deficient in common food-stuffs.

The present process is therefore extremely important in that it provides an economical as well as a commercially feasible method for the production of L-tryptophan.

Up to now, various processes have been proposed for the production of L-tryptophan. One of the reported processes which seems to have some prospect of success is a process in which an anthranilic acid-requiring mutant is employed.

However, the enzyme system is weakened or even inhibited resulting in the reduction of production of L-tryptophan when anthranilic acid is used as a starting material in a larger amount than that required for the growth of microorganism employed regardless of the stages of addition of anthranilic acid, namely, even after the completion of the growth and formation of L-tryptophan-synthetic enzyme system.

The object of this invention, therefore, is to provide an improved process for the production of L-tryptophan, said process being feasible for commercial scale production.

Another object of this invention is to provide a mutant suitable for the production of L-tryptophan which requires anthranilic acid for growth of the microorganism and at the same time is resistant to the inhibitive action of anthranilic acid in the formation of L-tryptophan.

Another object is to provide an efficient medium which is most suitable for the production of L-tryptophan.

Further objects of this invention will be disclosed in the following detailed description.

In an attempt to overcome the objectionable features of convention processes for the production of L-tryptophan, it has been found that one type or group of mutants is extraordinarily useful and suitable in producing L-tryptophan on a commercial scale. This type or group of mutants requires anthranilic acid for its growth and at the same time, is resistant to anthranilic acid. This group of mutants is selected from microorganisms of the genus Bacillus.

Further, it has also been discovered that the new group of mutants can produce, surprisingly and unexpectedly, a significant amount of L-tryptophan in the presence of specific carboxylic acids.

This invention is the culmination of the above discoveries.

In the present invention, use is made of microorganisms of the genus Bacillus which require anthranilic acid for their growth and at the same time are resistant to anthranilic acid.

To select such microorganisms, one of the routine procedures established for the selection of auxotroph mutants was first applied to, for example, a naturally occurring Bacillus strain. From among the resulting auxotraph mutants, anthranilic acid-resistant strains were selected.

Thus, the suitable microorganisms which have been selected by various mutagenic treatments are respectively cultivated in a minimal medium containing carbon and nitrogen sources as well as inorganic nutrients and others which are employable for the cultivation of common Bacillus microorganisms but are free from anthranilic acid, indole and L-tryptophan and a similar minimal medium supplemented with anthranilic acid. Those strains which do not grow on the former medium but do selectively grow in the latter are selected as anthranilic acid-requiring microorganisms.

The anthranilic acid requiring microorganisms employed in the process of this invention are invariably capable of growing in the presence of any substance that occurs in the biosynthetic path away from the anthranilic acid to L-tryptophan, for example, indole or L-tryptophan itself and usually these microorganisms are of the genus Bacillus such as *Bacillus subtilis*, *Bacillus pumilus*, *Bacillus circulans*, *Bacillus licheniformis*, *Bacillus polymyxa*, *Bacillus firmus*, *Bacillus brevis*, *Bacillus sphericus*, etc. Among these microorganisms, two mutants of *Bacillus subtilis* have been deposited at the Institute for Fermentation, Osaka under accession numbers IFO 13219 and IFO 13220, respectively.

Cultures of these microorganisms were deposited with the American Type Culture Collection in Rockville, Maryland on Feb. 24, 1972 under ATCC Nos. 21777 and 21778, respectively. Cultures of these microorganisms will be maintained by the Applicants (or their Assignee) throughout the life of the patent.

Though the objects of this invention may to some extent be accomplished by the use of microorganisms which require a precursor of anthranilic acid, for example, shikimic acid, the increase in yield of L-tryptophan that is obtained is far less significant than that attainable with anthranilic acid-requiring strains.

The anthranilic acid-resistant strains are those microorganisms which show normal growth even in the presence of anthranilic acid in excess of the maximum concentration at which their parent strains can grow under the same cultural conditions. Usually such a maximum concentration is about 1 mg/ml.

Thus, the strains which can grow in said minimal medium supplemented with more than such a maximum concentration, e.g., 3 mg/ml. of anthranilic acid, are employed for the purpose of this invention.

Those microorganisms are cultivated in a medium containing one or more members of the group consisting of anthranilic acid, indole and L-tryptophan, in addition to the carbon sources, nitrogen sources, inorganic salts, vitamins and other nutrient sources which are usually employed for the cultivation of Bacillus microorganisms.

The principal carbon sources include glucose, starch and other carbohydrates and hydrocarbons, and the nitrogen sources include such organic and inorganic materials as urea, ammonia, corn steep liquor, ammonium sulfate, and the like.

This invention may be carried out using indole in place of anthranilic acid as a starting material. However, the yield attainable is considerably lower than the yield obtained by the addition of anthranilic acid. In the present invention, a microorganism of the genus Bacillus which requires anthranilic acid for its growth and is resistant to anthranilic acid is first cultivated in the presence of a growth-limiting amount of one or more members of the group consisting of anthranilic acid, indole and/or L-tryptophan and, after the microorganism has completed its growth under those conditions anthranilic acid is fed to the broth and the microorganism is further cultivated and allowed to elaborate L-tryptophan.

By "growth-limiting amount" is meant an amount which is not more than that required for the maximum growth of the microorganism employed and, while such amount varies somewhat with the strains, cultural conditions and other factors, the amount may, for example, be about 5 to 60 γ/ml. anthranilic acid and about 10 to 80 γ/ml. of indole or tryptophan, respectively when they are used independently.

In addition to the above-mentioned medium components, a known mono- and/or di-carboxylic acid(s) of low molecular weight is employed with much better results in the present invention. Such carboxylic acids are those which have up to seven carbon atoms and do not inhibit the growth of the microorganisms employed and are represented by the general formula

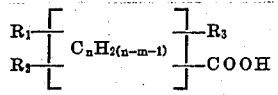

wherein $R_1$ is H or COOH, $R_2$ and $R_3$ are H or OH, n is whole number of 1 through 5 and m is 0 or 1 (n > m), respectively. Suitable carboxylic acids include, for example, acetic acid, propionic acid, butyric acid, lactic acid, succinic acid, tartaric acid, fumaric acid, maleic acid, pimelic acid, pivalic acid, caproic acid, heptoic acid, and the like, and among others, succinic acid, tartaric acid, fumaric acid and maleic acid are particularly suitable and similarly, acetic acid is also quite suitable. The salts of such carboxylic acids may be the corresponding alkali metal salts thereof such as, for example, sodium or potassium salts or the corresponding alkaline earth metal salts thereof such as, for example, magnesium.

The above-mentioned acids or salts thereof may be previously added to the medium, or alternatively, incorporated during the growth of the microorganism or, after the microorganism has sufficiently grown. The addition may also be made in several installments. Generally, however, more satisfactory results are obtained when the acid or salts thereof have been previously added to the medium. The concentration of said acids in the culture medium varies depending on the acid used and the other cultural conditions, but must suitably, not less than about 0.3%.

Desirably, the cultivation is carried out aerobically, for example, under agitation, or under aeration and agitation. Although the cultivation may be conducted under conventional conditions to be selected for the cultivation of a strain of the genus Bacillus, the incubation is generally made at about 20° to 40°C and at a pH between about 4.5 and 10.0 and preferably between about 6.0 and about 9.0.

The isolation and purification of L-tryptophan from the culture broth can be easily effected by conventional means as, for example, by a series of adsorption and elution steps with the use of activated carbon or an ion exchange resin.

The following Experiment and Examples are further illustrative of this invention.

Throughout the specification, the relationship between part(s) by weight and part(s) by volume is the same as that between gram(s) and milliliter(s); percentage is in weight by volume (when used as the precentage of ingredients in culture medium) or weight by weight (Other than the above case), mg., γ, ml. and °C mean respectively milligram(s), microgram(s), milliliter(s) and degrees centigrade. And, numbers prefixed "IFO" after the designation of microorganisms show respectively the accession numbers of the microorganism at the Institute for Fermentation, Osaka, Japan.

EXPERIMENT

A comparative experiment on the production of L-tryptophan was carried out in a medium supplemented with sodium succinate or sodium tartrate, both of which are typical of the mono- or dicarboxylic acids, and in a medium free from any of such acids and salts and with three microorganisms as test strains which represent a wild strain, an anthranilic acid-requiring mutant derived therefrom, and a mutant according to the present invention, respectively. The results are set forth in the following table.

TABLE 1

| strain<br><br>Carboxylic<br>Acid % as salt<br>(% as free acid) | Output of L-tryptophan (mg/ml.) | | |
|---|---|---|---|
| | wild strain<br>Bacillus<br>subtilis<br>(IFO 3009) | anthranilic<br>acid-<br>requiring<br>mutant<br>Bacillus<br>subtilis<br>(IFO 13308) | anthranilic<br>acid-<br>requiring<br>anthranilic<br>acid-resistant<br>mutant<br>Bacillus<br>subtilis<br>(IFO 13219;<br>ATCC 21777) |
| Control<br>(no addition) | trace | 0.21 | 2.21 |
| Sodium succinate | | | |
| 0.05 (0.022) | trace | 0.20 | 2.21 |
| 0.1 (0.044) | trace | 0.20 | 2.22 |
| 0.3 (0.131) | trace | 2.03 | 4.47 |
| 0.5 (0.219) | trace | 2.20 | 8.23 |
| 1.0 (0.437) | trace | 2.50 | 9.54 |
| 2.0 (0.874) | trace | 2.47 | 8.21 |
| Sodium tartrate | | | |
| 0.05 (0.333) | trace | 0.20 | 2.38 |
| 0.1 (0.065) | trace | 0.31 | 2.24 |
| 0.3 (0.196) | trace | 0.32 | 2.23 |
| 0.5 (0.326) | trace | 1.95 | 5.45 |
| 1.0 (0.652) | trace | 2.58 | 8.61 |
| 2.0 (1.305) | trace | 2.78 | 9.24 |

EXAMPLE 1

20 parts by volume of a seed-culture medium composed of 2% soluble starch, 2% corn steep liquor, 0.3% dipotassium phosphate, 0.1% monopotassium phosphate, 30 γ/ml. anthranilic acid and 1 γ/ml. biotin (pH 7.2) is poured into a fermentor, (50 parts by volume in capacity) which is then sterilized and is inoculated with a culture of an anthranilic acid-requiring, anthranilic acid-resistant mutant (IFO 13219 ATCC No. 21777) derived from Bacillus subtilis (IFO 3009). The inoculated medium is incubated at 37°C and aerated for 24 hours.

Separately, 200 parts by volume of a fermentation medium composed of 14% glucose, 3% corn steep liquor, 0.9% urea, 1% sodium succinate (0.0437% as free acid) 0.5% dicalcium phosphate, 0.5% tricalcium phosphate, 0.037% disodium ethylenediamine tetraacetate ($2H_2O$), 3% calcium carbonate, 1 γ/ml. biotin and 20 γ/ml. anthranilic acid (pH 7.2) is poured into a fermentor (500 parts by volume in capacity) and then sterilized. 20 parts by volume of the above-prepared seed culture is transferred to the fermentation medium and the inoculated medium is incubated at 37°C for 16 hours. Then, a neutralized solution of anthranilic acid is added in a concentration of 8 mg. relative to 1 ml. of the culture broth, followed by a further incubation at 37°C and aerated for 48 hours.

The resulting fermentation broth contains 10.4 mg/ml. of L-tryptophan. The above broth (200 parts by volume) is adjusted to pH 6.5 and, after boiling at 100°C for 10 minutes, the cells are removed by centrifugation. The supernatant is treated with 50 parts by weight of activated carbon so that L-tryptophan is adsorbed thereon. After washing with water, the activated carbon is subjected to elution with 500 parts by volume of 50% ethanol to collect L-tryptophan. The eluate is concentrated under reduced pressure to 200 parts by volume and the concentrate is adjusted to a pH 4.5 and made up to 300 parts by volume. The solution is passed through 60 parts by volume of ion exchange resin (Dowex 50 × 8, Na-form (Dow Chemicals)) which has been buffered with 1000 parts by volume of 0.1 M citrate buffer (pH 3.4).

Then, 1,500 parts by volume of 0.1 M citrate buffer (pH 5.0) is poured onto the column and, thereafter, the L-tryptophan is eluted with 400 parts by volume of 50% ethanol-0.28% ammonia.

The eluate is concentrated under reduced pressure to 180 parts by volume and the concentrate is adjusted to pH 6.0 and made up to 250 parts by volume with water. The solution is treated again with 20 parts by weight of activated carbon, which is then eluted with 50% ethanol-0.28% ammonia. The eluate is concentrated under reduced pressure, whereupon 1.58 parts by weight of crystalline L-tryptophan is obtained.

The analysis of this product, shown below, is in agreement with the published values:

$[\alpha]^{22}_D$ −31.3 (C = 1.0, water)

Elemental analysis
Calcd.: C, 64.92%; H, 6.07%; N, 13.78%
Found: C, 64.69%; H, 5.92%; N, 13.72%

EXAMPLE 2

Using an anthranilic acid-requiring, anthranilic acid-resistant mutant strain (IFO 13220 ATCC No. 21778) of Bacillus subtilis, a seed culture is prepared under the same conditions described in Example 1, 20 parts by volume of the seed culture is transplanted to a main fermentor (500 parts by volume in capacity) which contains 200 parts by volume of a fermentation medium of the following composition. The inoculated medium is incubated at 37°C and aerated for 16 hours.

(Fermentation medium)

15% glucose, 3% corn steep liquor, 0.9% urea, 1% sodium tartrate (0.652% as free acid), 0.3% monopotassium phosphate, 0.3% dipotassium phosphate, 0.2% magnesium sulfate, 3% calcium carbonate, 0.5 γ/ml. biotin and 30 γ/ml. anthranilic acid (pH 7.2)

Then, a neutralized solution of anthranilic acid is added to a concentration of 10 mg. per ml. of the fermentation medium and the medium is further incubated at 37°C and aerated for 48 hours. The resulting fermentation broth contains 11.7 mg/ml. of L-tryptophan.

EXAMPLE 3

20 Parts by volume of a seed culture medium composed of 2% soluble starch, 2% corn steep liquor, 0.3% dipotassium phosphate, 0.1% monopotassium phosphate, 30 γ/ml. anthranilic acid and 3 γ/ml. vitamin $B_1$ (pH 7.2) is poured into a fermentor, 200 parts by volume in capacity, which is then sterilized and is inoculated with a culture of an anthranilic acid-requiring, anthranilic acid-resistant mutant (IFO 13219 ATCC No. 21777) derived from Bacillus subtilis (IFO 3009). The inoculated medium is incubated at 37°C and aerated for 16 hours. Then, the culture broth is transplanted to a main fermentor, (500 parts by volume in capacity) which contains 200 parts by volume of a fermentation medium of the following composition. The inoculated medium is incubated at 37°C, aerated for 16 hours and a neutralized solution of anthranilic acid is added in a concentration of 8 mg relative to 1 ml of the culture broth, followed by further 48 hrs. incubation and aeration at 37°C, accompanied by agitation.

| Medium | |
|---|---|
| Glucose | 15% |
| *Proflo (Traders' Oil Mill Company, U.S.A.) | 2.0% |
| Urea | 0.9% |
| $KH_2PO_4$ | 0.3% |
| $K_2HPO_4$ | 0.3% |
| Anthranilic acid | 10 γ/ml. |
| Vitamin B | 3 mg/l. |
| Various carboxylic acids | |

The results are shown in the following Table.

*defatted cotton seed meal

TABLE 2

| | % as free acid | Output of L-tryptophan (mg./ml.) | | | | | | |
|---|---|---|---|---|---|---|---|---|
| | | 0 | 0.1 | 0.3 | 0.5 | 1.0 | 2.0 | 3.0 |
| Carboxylic Acid | | | | | | | | |
| Succinic Acid | | 2.34 | 2.75 | 8.52 | 9.23 | 10.59 | 9.78 | 4.20 |

Table 2 -Continued

| | % as free acid | Output of L-tryptophan (mg./ml.) | | | | | |
|---|---|---|---|---|---|---|---|
| | | 0 | 0.1 | 0.3 | 0.5 | 1.0 | 2.0 | 3.0 |
| Carboxylic Acid | | | | | | | | |
| Acetic Acid | | | 2.20 | 4.50 | 5.55 | 4.11 | | |
| Fumaric Acid | | | 2.10 | 6.54 | 7.56 | 6.33 | | |
| Lactic Acid | | | 2.56 | 2.47 | 4.58 | 6.47 | 5.72 | 5.20 |
| Propionic Acid | | | 2.54 | 6.70 | 7.58 | 6.67 | | |
| Pivalic Acid | | | 3.23 | 4.78 | 5.70 | 3.90 | | |
| Tartaric Acid | | | 2.34 | 2.74 | 7.32 | 8.15 | 4.63 | |
| Maleic Acid | | | 2.51 | 6.18 | 7.64 | 7.22 | 3.91 | |
| Pimelic Acid | | | 2.40 | 2.50 | 4.20 | 5.15 | 3.12 | |

What is claimed is:

1. A method for producing L-tryptophan, which comprises cultivating under submerged aerobic conditions a microorganism of the genus Bacillus which requires anthranilic acid for its growth and is resistant to anthranilic acid, in a culture medium containing a growth-limiting amount of one or more members of the group consisting of anthranilic acid, indole, and L-tryptophan, and then adding to the culture broth an amount of anthranilic acid in excess of that required for bacterial growth whereby causing the microorganism to elaborate L-tryptophan, and recovering the desired L-tryptophan product.

2. A method according to claim 1, wherein indole and L-tryptophan are present in the medium.

3. A method according to claim 1, wherein at least one mono- or di-carboxylic acid of the formula

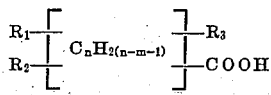

wherein $R_1$ is H or COOH, $R_2$ and $R_3$ are H or OH, n is whole number of 1 through 5 and m is 0 or 1 (n > m), or a salt thereof, is also present in the medium.

4. A method according to claim 3, where said carboxylic acid is fumaric acid or a salt thereof.

5. A method according to claim 3, wherein said carboxylic acid is maleic acid or a salt thereof.

6. A method according to claim 3, wherein said carboxylic acid is tartaric acid or a salt thereof.

7. A method according to claim 3, wherein said carboxylic acid is succinic acid or a salt thereof.

8. A process according to claim 3, wherein the culture medium is maintained at a temperature between about 20° and 40°C and a pH between about 4.5 and 10.0.

9. A method according to claim 1, wherein said microorganism is Bacillus subtilis.

10. A process according to claim 9, wherein said Bacillus subtilis microorganism is Bacillus subtilis ATCC 21777.

11. A process according to claim 9, wherein said Bacillus subtilis microorganism is Bacillus subtilis ATCC 21778.

\* \* \* \* \*

UNITED STATES PATENT OFFICE
CERTIFICATE OF CORRECTION

Patent No. 3,801,457           Dated April 2, 1974

Inventor(s)   Kei Arima, et al

It is certified that error appears in the above-identified patent and that said Letters Patent are hereby corrected as shown below:

On the first page of the patent, the inventor's name should read --Ikuo Nogami--

The name of the Assignee company has also been mis-spelled and should read --Takeda Chemical Industries, Ltd.--

Signed and sealed this 8th day of October 1974.

(SEAL)
Attest:

McCOY M. GIBSON JR.
Attesting Officer

C. MARSHALL DANN
Commissioner of Patents